(12) United States Patent
Knote et al.

(10) Patent No.: US 8,819,068 B1
(45) Date of Patent: Aug. 26, 2014

(54) AUTOMATING CREATION OR MODIFICATION OF DATABASE OBJECTS

(75) Inventors: Korey Allen Knote, Summer, WA (US);
Kumar S Gounder, Bothell, WA (US);
Mark J Golazeski, Seattle, WA (US);
Deenadayal S Yakkali, Redmond, WA (US); Jay Borja, Mercer Island, WA (US); Rakesh Poddar, Seattle, WA (US); Suresh Viswanathan, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/227,300

(22) Filed: Sep. 7, 2011

(51) Int. Cl.
*G06F 17/30* (2006.01)

(52) U.S. Cl.
USPC .......................................... 707/790; 707/807

(58) Field of Classification Search
USPC .................................................. 707/790, 807
See application file for complete search history.

(56) References Cited

U.S. PATENT DOCUMENTS

| 5,428,776 | A  | * | 6/1995  | Rothfield ............................... 1/1 |
| 7,412,451 | B2 | * | 8/2008  | McCrady et al. ..................... 1/1 |
| 7,747,469 | B2 | * | 6/2010  | Hinman ..................... 705/26.81 |
| 7,958,387 | B2 | * | 6/2011  | Silverman et al. ............. 714/4.1 |
| 8,150,886 | B2 | * | 4/2012  | Rhodes et al. ................. 707/802 |
| 8,150,889 | B1 | * | 4/2012  | Bacthavachalu et al. ..... 707/802 |
| 8,209,349 | B2 | * | 6/2012  | Howes et al. .................. 707/769 |
| 8,533,524 | B2 | * | 9/2013  | Silverman et al. ............. 714/4.1 |
| 2005/0256852 | A1 | * | 11/2005 | McNall et al. .................... 707/3 |

* cited by examiner

*Primary Examiner* — Kim Nguyen
(74) *Attorney, Agent, or Firm* — Lee & Hayes, PLLC

(57) ABSTRACT

In some implementations, a user interface (UI) module provides a user interface to a user device to enable input of information for creating or modifying a database object, such as a schema object of a schema maintained in one or more separate databases. The UI module may determine validity of the inputs in real time as the user enters the inputs. Further, the UI module may check permissions of the user and/or obtain a manual approval of a request for creating or modifying the database object. The UI module may forward the user inputs with instructions for creating or modifying the database object to one or more databases. Computing devices associated with the databases may create or modify the database object based, at least in part, on the inputs from the user, creation or modification rules, syntax rules and/or a logical database associated with the user.

24 Claims, 10 Drawing Sheets

AUTOMATING CREATION OR MODIFICATION OF DATABASE OBJECTS

BACKGROUND

Database users may be associated with one or more schemas. A schema is a collection of schema objects, such as tables, views, sequences, synonyms, indexes, columns, partitions, clusters, database links, snapshots, procedures, functions and packages that may be employed by the database users for carrying out various tasks. Schema objects may serve as logical data storage structures, and do not necessarily have a one-to-one correspondence to physical files that store the corresponding information. For example, a database may store a schema object logically within a tablespace of the database, while the data corresponding to each object is physically contained in one or more data files of the tablespace. However, creation, alteration or manipulation of schema objects can be complex and is typically performed manually by database administrators to ensure that the schema objects are properly constructed, modified, positioned, propagated across multiple databases, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Creating or Modifying Database Objects

Figure 1:
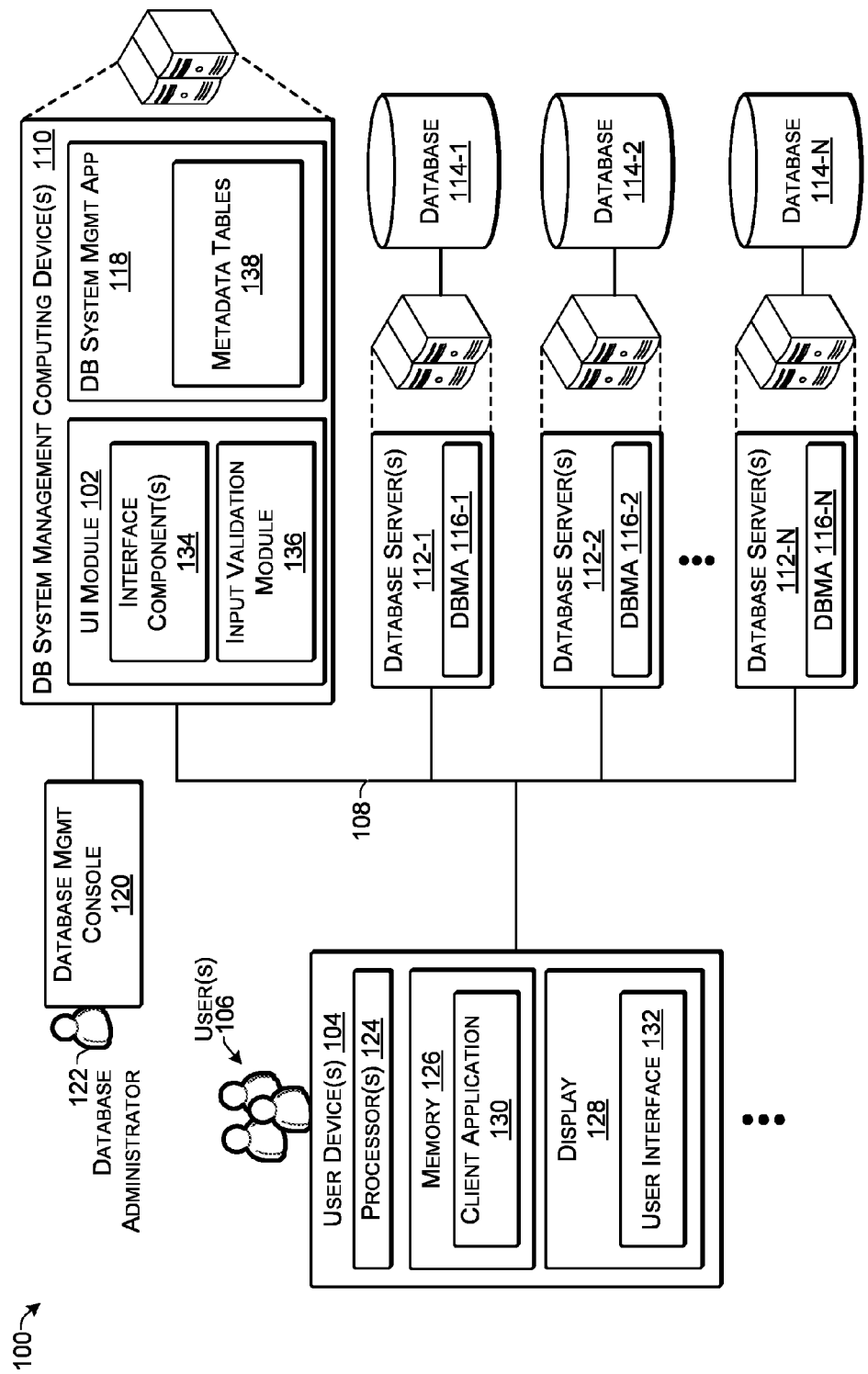
FIG. 1 illustrates an example architecture of a system for enabling users to create or modify database objects through a user interface according to some implementations.

This disclosure includes techniques and arrangements for creating or modifying objects in a database. For example, some implementations provide a user interface that enables a user to create or modify database objects through interaction with the user interface. In some implementations, the user may employ the user interface to make modifications to a database schema, such as for adding, modifying or deleting a schema object. The user interface enables the user to input values and information for creating, modifying or otherwise manipulating a particular schema object. The techniques further include automatically creating or modifying a schema object on one or more databases based on the user's entries or selections in the user interface. Thus, scripts or code for creating or modifying a schema object are generated automatically at one or more databases based, at least in part, on the inputs received in the user interface. Additionally, the changes to a user's schema may be propagated across a plurality of distinct databases without the user or a database administrator having to log into each separate database. Accordingly, implementations herein provide a user interface that receives a business-side input, checks validity of the input, and passes the input to at least one database for generating a change to a database configuration. Further, in some implementations, the change may be automatically applied to multiple separate databases. As one example, the inputs received through the user interface may be processed by each database of multiple databases for creating or modifying a database object on each of the multiple databases.

In some implementations, a plurality of users may each have one or more schemas in one or more of a plurality of databases. The schema of a particular user may contain a plurality of schema objects, such as tables, columns, partitions, and so forth, which the particular user employs for performing various tasks, such as generating reports, performing analysis, performing data mining, and the like. As one non-limiting example, when the user desires to create a new a database object, the user may enter values and information for the desired database object into the user interface provided to the user. The user may fill in requested information in the user interface for creating the database object and may be prompted or assisted with certain values, such as through dropdown menus. Additionally, the interface may include an input validation module to check and validate the user's entries in real time, and provide real-time feedback to the user. For example, if the user inputs information that is determined to be invalid, the user interface may provide an error message or otherwise prompt the user to change the input.

When or after the user inputs the information into the user interface to create or modify the database object, a permissions module receives the input information and determines whether the user is permitted to create or modify the intended database object. For example, the permissions module may verify the permissions of the user to create or modify the database object. If the user does not have permission, the user interface may display this information to the user. Furthermore, following completion of the inputs and submission of the request to change or modify the database object, a manual approval module may submit the request to another person to obtain manual approval of the request. For example, the request for approval may be displayed in a user interface similar to the user interface used for receiving the user inputs, but may be displayed to a manager or other person having primary responsibility for a schema affected by the request.

Upon deterring that the request from the user satisfies the criteria for valid inputs, user permissions and manual approval, the UI module passes the inputs to one or more databases for creating or modifying the database object on the one or more databases. Each particular database of the one or more databases performs validation of the inputs with respect to the particular database. Upon determining that the inputs are valid for the particular database, each database receiving the inputs generates a set of instructions to create or modify the database object based on the inputs from the user.

In some implementations the techniques may be employed for creating or modifying schema objects, such as for creating tables, columns, partitions, or indexes; cloning local or remote tables; modifying a column; renaming a table; changing privileges on a table; synchronizing indexes; deprecating a table; and so forth. Further, some implementations enable the use of plain language, such as plain English inputs for creating or modifying a database object, without requiring the user to know the details of database language syntax or the current database configuration. Thus, some implementations provide a standardized set of processes for a variety of database object operations that may be initiated by a user, such as a typical business user of the database, rather than a database administrator that manages the database operation and configuration. For example, by using predefined inputs from a user for generating or modifying a database object, implementations herein ensure that tables and other database objects conform to predetermined standards, and thereby prevent users from intentionally or unintentionally creating or modifying objects outside of those standards. In addition, as mentioned above, the requested object creation or modification may be subject to a validation and approval process prior to implementation of the object creation or modification on the one or more databases. In some implementations, the validation and approval process may be at least partially automated and based on business logic rules, such as for preventing creation of tables that exceed a predetermined size, do not include complete information, etc.

Further, during creation or modification of a database object on one or more databases, the user interface may provide the user with real-time updates as each step in the creation or modification process is performed. Following creation or modification of the database object in one or more databases, the system may provide the user with a communication indicating that the request was completed successfully. In some implementations, the communication may be provided through the user interface, while in other implementations, the communication may be an email, a text message, or other electronic communication. If the request is not completed successfully, or if the request is declined, the user may receive a communication informing the user of this as well, which may include an error message, reason the request was declined, or the like. For example, as mentioned above, the permissions of the user may be automatically checked to determine whether the user is authorized to create a particular database object or otherwise modify the database object. Thus, if the user attempts to copy a table that the user does not have permission to copy, the system can detect this condition during the validation stage and notify the user of the lack of permission. The user may subsequently contact the database administrator regarding the error message or rejection of the request to remedy the problem.

Furthermore, in some implementations, the user may specify that the created database object should only be accessible to certain other users of a plurality of users. For example, the user may create a table and specify that the table, or a portion thereof, is only to be exposed to certain identified users, thus effectively hiding the table, or the portion thereof, from other users not specified by the user. Accordingly, sensitive business information may be controlled and revealed only to those users approved to view the information. These specifications of the user can be enforced using database policies and privileges.

In addition, some implementations provide techniques for management of database partitions. For example, some databases may contain large tables and require techniques both for managing these large tables and for providing good query performance across the large tables. The techniques herein enable creation of new database partitions, such as based on table definition inputs made by the user to the user interface. Further, the techniques herein enable specification of how long a partition will remain in a database and other partition management operations. For example, typically a database administrator must actively script the creation of partitions or the dropping of unused partitions. However, implementations herein provide for automated partition management by making partition management part of the definition of a table during creation of a table by a user. Consequently, the techniques herein include automated control over how partitions are created and how long partitions will remain in the database.

In some implementations, the user interface enables a user to manage the user's schema in a logical database. For example, there may be hundreds or thousands of users in a multi-database system. Each user may have their own schema in the database system, often across multiple different databases or clusters. Rather than having to log into each of a plurality of different databases, such as for creating or modifying a schema object in each of the plurality of different databases, the user interface herein enables a user to manage and interact with a logical database that represents the user's schema across the plurality of databases. Accordingly, the creation of a schema object or the modification of a schema object in the logical database can be automatically propagated across the plurality of different physical databases that maintain the user's schema.

Some implementations are described in the environment of creating or modifying objects in a relational database, such as a data warehouse, cluster database, schemas, and the like. However, the implementations herein are not limited to the particular examples provided, and may be extended to other types of database objects and other types of databases, as will be apparent to those of skill in the art in light of the disclosure herein.

Example Architecture

FIG. 1 illustrates an example architecture of a system 100 including a user interface (UI) module 102 for enabling user-initiated creation or modification of database objects according to some implementations. The UI module 102 is able to communicate with one or more user devices 104 and/or one or more users 106 through a communication link 108. For example, in some implementations, the UI module 102 may execute on one or more database system management (DBSM) computing devices 110, and the user device(s) 104 and DBSM computing device(s) 110 may also be in communication with one or more database server computing devices 112 and one or more databases 114. In the illustrated example, there are a plurality of database servers 112-1, 112-2, . . . , 112-N, and a corresponding plurality of databases 114-1, 114-2, . . . , 114-N. For instance, each database 114 may be a separate physical database managed by a corresponding separate plurality of database servers 112.

The database server(s) 112 may execute various database applications or other software to provide access to and manage the databases 114. For example, a database management application (DBMA) 116 may be executed on the database servers 112, such as a DBMA 116-1 on the database server(s) 112-1, a DBMA 116-2 on the database server(s) 112-2, and a DBMA 116-N on the database server(s) 112-N. Furthermore, the DBSM computing device 110 may include a database system management application (DBSMA) 118 for managing, overseeing and coordinating operations of the plurality of databases 114-1 through 114-N. In addition, a database management console 120 may be in communication with the DBSM computing device(s) 110 to enable a database administrator 122 to interact with the database system management application 118 and/or the UI module 102. For example, the database management console 120 may be directly connected to the DBSM computing device(s) 110, or may be a personal computer, or the like, in communication through the communication link 108 in a manner similar to the user device(s) 104.

The communication link 108 may include any of a direct connection, a local area network (LAN), a wide area network (WAN), or any combination thereof, and may include both wired and wireless communication technologies using any suitable protocols and communication techniques. For example, in some implementations, the communication link 108 may include the Internet, and the DBSM computing device 110, the user device 104, and the database servers 112 may communicate and interact with one another using any combination of suitable communication and networking protocols, such as Internet protocol (IP), transmission control protocol (TCP), hypertext transfer protocol (HTTP) and so forth. In some implementations DBSM computing device(s) 110, the database servers 112, and the user device(s) 104 may be located at a data center, server farm, enterprise facility, organization campus, or other single physical location, and able to communicate with one another through a LAN. In other implementations, the DBSM computing device 110, the database servers 112, and the user device(s) 104 may be located in diverse locations that are physically remote from one another, and the communication link 108 may include the Internet or other long distance communication network. In some examples, the user device(s) 104 may communicate with the DBSM computing device(s) 110, and the DBSM computing device(s) 110, in turn, control communications to one or more targeted database servers 112 and corresponding databases 114, thereby limiting direct access of the user device(s) 104 to the database servers 112. In other examples, however, the ability to communicate between the user devices(s) 104, the DBSM computing devices(s) 110 and the database servers 112 is not restricted. Accordingly, the implementations herein are not limited to any particular networking or communication arrangements or configurations.

The user device(s) 104 may be any suitable type of computing device, such as a personal computer, workstation, thin client device, laptop, netbook, tablet computing device, media device, smart phone, and so forth. As such, the user device 104 may include one or more processors 124, a memory 126, and a display 128. In some implementations, the user device 104 may include a client application 130 maintained on the memory and executed on the one or more processors 124 to provide a user interface 132 to the user 106. For example, the client application 130 may access the UI module 102 for receiving and rendering the user interface 132 on the display 128. In some implementations, the client application 130 may be a web browser or other application able to receive a web-based user interface as the user interface 132. In other implementations, the client application 130 may be an application or other piece of software that generates the user interface 132 and communicates user-entered information with the UI module 102. Accordingly, implementations herein are not limited to a particular client application type or configuration.

The user 106 may employ the user interface 132 to create or modify one or more database objects in one or more of the databases 114. For example, the databases 114 may contain one or more database objects (not shown in FIG. 1) associated with the user 106. As described additionally below, the user 106 may enter information into the user interface 132 to create or modify a database object in one or more of the databases 114. For instance, the UI module 102 receives the information entered into the user interface 132 by the user 106, verifies and validates the inputs from the user 106, and provides the inputs to one or more of the database servers 112 for creating or modifying a database object in one or more of the databases 114.

The UI module 102 may include one or more interface components 134 for displaying various different instances of the user interface 132 for performing various different tasks for creation or modification of a database object. Examples of the various different tasks that may correspond to the interface components 134 include task interfaces for creating a table, creating a partition, creating a column, copying a table, cloning a table, creating an index, modifying a column, and so forth. The UI module 102 may also include an input validation module 136 that automatically checks the validity of the inputs as the user enters the inputs into the user interface 132. For example, the UI module 102 may include a table driven user interface 132 that uses a plurality of metadata tables 138 maintained by the database system management application 118. Thus, the UI module 102 may obtain one or more predetermined metadata tables 138 when using a particular interface component 134 to display a particular instance of the user interface 132 for performing a particular task. Information in the metadata tables 138 may be automatically applied to generate the user interface 132 based on one or more templates. The metadata tables 138 may be changed or updated and can thereby be used to change the specifications and requirements for performing a particular task for creating or modifying a database object, such as creation of a table, copying a table, etc. Accordingly, rather than hard coding the UI module 102 with particular specifications or parameters, the UI module 102 may use templates for the metadata tables 138 to generate the user interface 132 and thereby, the user interface 132 may be updated by merely changing the configuration or parameters of the metadata tables 138. Thus, changing one or more parameters in the metadata tables 138 can change at least one feature in the user interface 132 that relates to receiving a user input for creating or modifying a database object.

As one example, with respect to a particular task, such as creating a table object, a particular set of one or more of the metadata tables 138 may be accessed by the particular create table interface component 134 for generating an instance of the user interface 132 configured to receive user inputs for creating a table object. In order to change particular requirements or parameters for creating the table object, one or more of the particular set of metadata tables 138 may merely be modified to change one or more parameters, rather than accessing the code of the UI module 102. During entry of the inputs for creating the table object, the input validation module may apply table creation rules based on the particular metadata tables for checking the validity of the inputs. For example, a table may specify that if a first parameter is received, a second parameter must also be received, must have a particular range, and so forth. Thus, the metadata tables 138 may be used during both generation of the user interface 132, and during validation of inputs received from a user.

The databases 114 may be any suitable database type or configuration. As one non-limiting example, one or more of the databases 114 may be configured as data warehouses. For instance, a data warehouse is a relational database designed for query and analysis, rather than for transaction processing, and often contains historical data derived from transaction data as well as data from other sources. Thus, a data warehouse configuration can separate analysis workload from transaction workload and enable an organization to consolidate data from several sources. Additionally, in some implementations, a data warehouse environment may include an extraction, transformation, loading and materialization (ETLM) solution, an online analytical processing (OLAP) engine, client analysis tools, and other applications that manage the process of gathering data and delivering the data to business users.

As an another non-limiting example, one or more of the databases 114 may be configured as clusters, such as by using Oracle® Real Application Clusters (RAC) (available from Oracle Corporation, Redwood Shores, Calif.), which is a cluster database having a shared cache architecture comprised of a plurality of nodes to provide a scalable and highly available database environment. Under this configuration, multiple computing devices may execute relational database management system software simultaneously while accessing a single database, thus providing a clustered database. However, in other implementations herein, a cluster database is not used. Accordingly, the techniques herein may be applied to any type of database and are not limited to use with a cluster database, a data warehouse, or the like.

Figure 2:
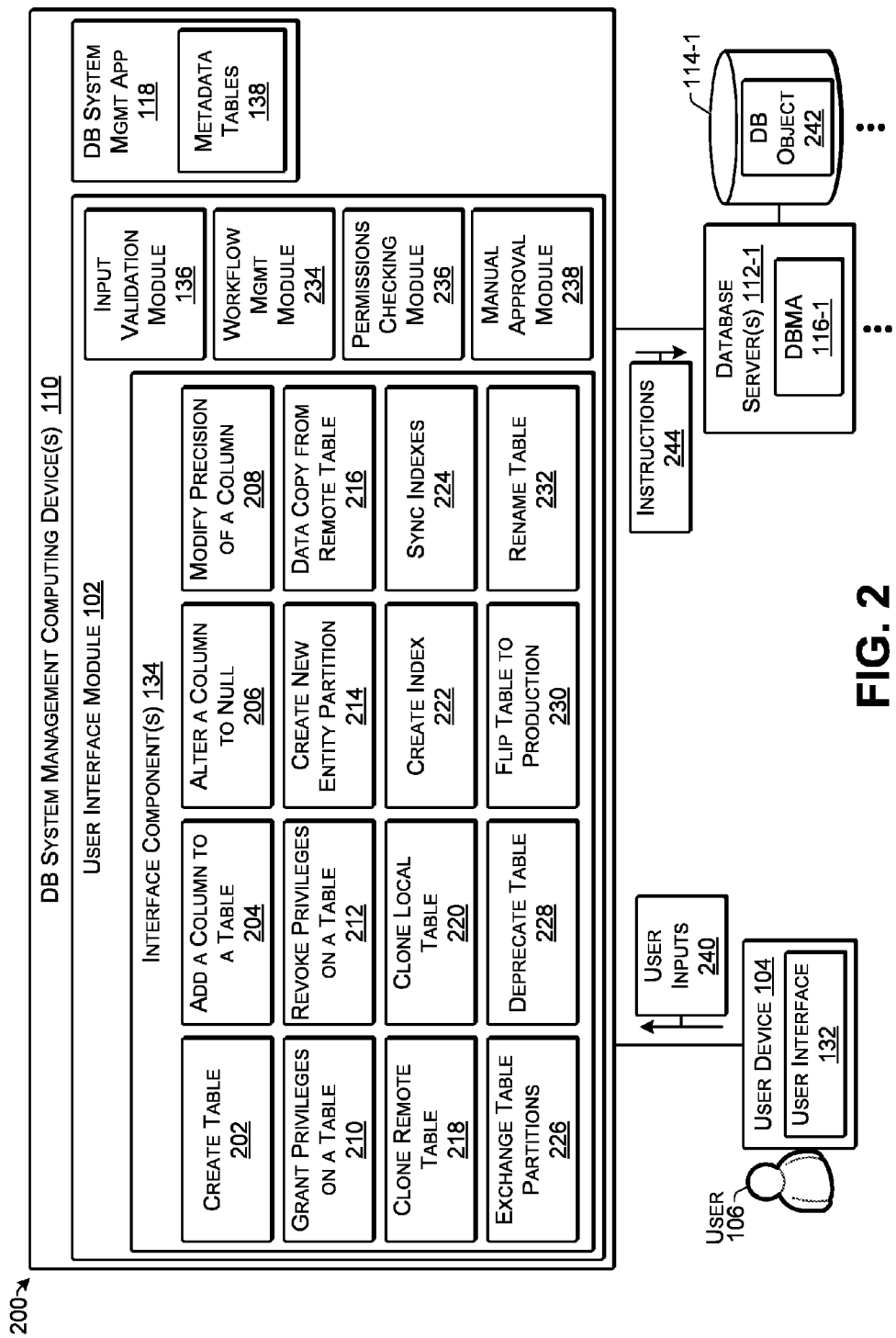
FIG. 2 illustrates example components of a UI module and provides an example of interaction with a user according to some implementations.

FIG. 2 illustrates an example framework 200 including select components of the UI module 102 according to some implementations. In the example of FIG. 2, the interface components 134 of the UI module 102 may include a plurality of interface components 202-232 for performing various different tasks or operations with respect to creation or modification of database objects. The interface components 202-232 may include: create table 202, add a column to a table 204, alter a column to null 206, modify precision of a column 208, grant privileges on a table 210, revoke privileges on a table 212, create new entity partition 214, data copy from remote table 216, clone remote table 218, clone local table 220, create index 222, synchronize indexes 224, exchange table partitions 226, deprecate table 228, flip table to production 230, and rename table 232. Furthermore, while example interface components 202-232 for performing a number of tasks or functions are described herein, the interface components 202-232 illustrated in FIG. 2 are only non-limiting examples of components that may be used to perform various operations for creating or modifying database objects in the database(s) 114.

In this example, the user interface module 102 also includes the input validation module 136, a workflow management module 234, a permissions checking module 236, and a manual approval module 238. As discussed above, the validation module 136 may perform validation of user inputs 240 received through the user interface 132 from a user 106. In some implementations, the validation may be performed using the metadata tables 138 that define parameters for creation or modification of a particular database object. The workflow management module 234 manages an overall workflow performed by the user interface module 102 for receiving the user inputs 240, performing input validation, checking permissions of the user 106, obtaining manual approval of the user's request for creation or modification of a database object 242, and scheduling the creation or the modification of the database object 242 in one or more of the databases 114.

The permissions checking module 236 may be invoked to check the permission of the user 106 to create or modify a particular database object. For example, the permissions checking module 236 may check a user ID of the user 106 or other information to determine whether the user is authorized to create or modify a database object within a particular database schema, particular logical database or other database location or entity. The manual approval module 238 may be invoked to submit a request of the user 106 to a person to obtain the person's authorization to proceed with creation or modification of the desired database object 242. As one example, the authorization may be requested from a person having primary or secondary responsibility for a particular schema in which the database object is to be created or modified. As another example, the person may be a database administrator or other person having management responsibility for the requester or the database to be affected.

The interface components 202-232 may be invoked to display a particular instance of a user interface 132 to create or modify a database object 242 in one or more of the databases 114. For example, the user 106 may enter user inputs 240 into the user interface 132 to provide information for creating or modifying a database object. The UI module 102 receives the user inputs 240 to the user interface 132, and the workflow management module 234 ensures that validation, permission checking and manual approval are carried out. When the validation, permission checking and/or manual approval are completed, the workflow management module 234 may generate instructions 244 that are provided to the database server(s) 112 of one or more of the databases 114. For example, the instructions 244 may provide the user inputs 204 for creation or modification of a database object to the one or more database servers 112 on which the database object will be created or modified. The database servers 112 receive the instructions 244 and perform local processing to create or modify the database object 242 in each of the databases 114 that receives the instructions 244. For example, the database management application (DBMA) 116 on each database server 112 may perform additional validation of the instructions 244 based on the particular database 114 managed by the database server 112. In some implementations, the DBMA 116 on each database server 112 may generate data definition language (DDL) instructions, or other suitable language format, from the instructions 244 to directly create or modify the database object 242.

As illustrated by the example of FIG. 2, numerous instances of the user interface components 132 may be presented to the user 106 for enabling the user to perform various corresponding operations for creating or modifying a database object according to implementations herein. For example, the create table component 202 may be used to create a table; the add a column to a table component 204 may be used to add one or more columns to an existing table; the alter a column to null component 206 may be used to remove a column from a table; the modify precision of a column component 208 may be used to change the size of values used in a particular column of a table; the grant privileges on a table component 210 may be used to enable certain users to view at least a portion of a table; the revoke privileges on a table component 212 may be used to revoke the privileges of certain users to view at least a portion of a table; the create new entity partition component 214 may be used to add a new entity to a partition; the data copy from remote table component 216 and used to copy data from a table in a first database to a second database; the clone remote table component 218 may be used to create a clone of a table on a remote database; the clone local table component 220 may be used to create a clone of a table on the same database; the create index component 222 may be used to generate an index for one or more columns of a table; the sync indexes component 224 may be used to synchronize one or more indexes in a database; the exchange table partitions component 226 may be used to transfer a table from a first partition to a second partition; the deprecate table component 228 may be used to deprecate a table that will no longer be used; the flip table to production component 230 may be used to convert a backfilled clone of a table to a production table so that the current production table can be deprecated; and the rename table component 232 may be used to rename a table in a database.

Additionally, the UI module 102 may enable partition management to be maintained by enforcing policies for table creation and manipulation. For example, partitioned tables and indexes facilitate administrative operations by enabling these operations to work on subsets of data. Further, partitioning data improves the manageability of very large databases and reduces the time required for administrative tasks, such as backup and restore. Some implementations herein provide for automated partition management by making partition management part of the definition of a table during creation of the table by a user. Consequently, implementations herein include automated control over how partitions are created and how long partitions will remain in the database.

Figure 3:
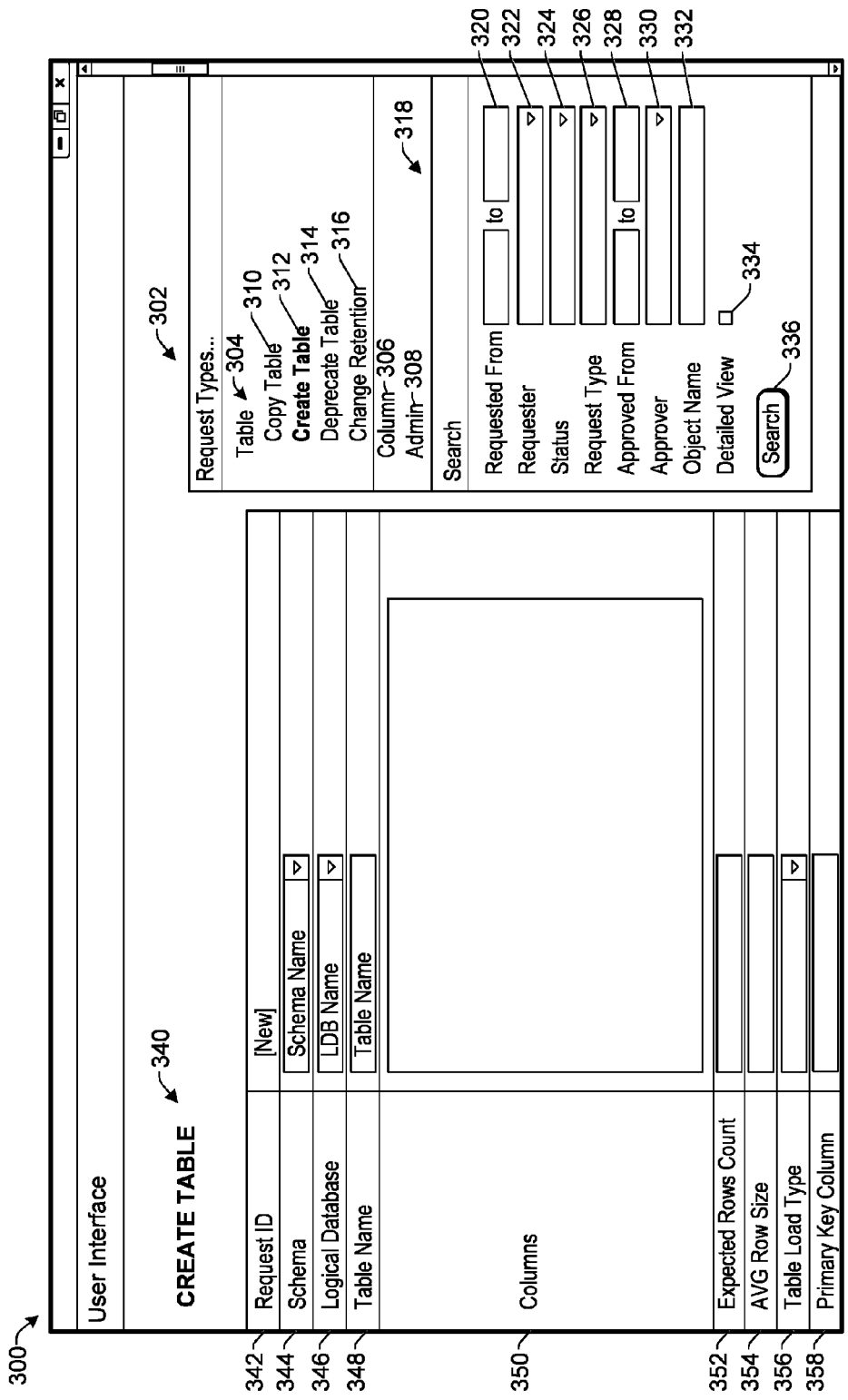
FIG. 3 illustrates an example user interface for creating a database object according to some implementations.

FIG. 3 illustrates an example user interface 300 that may be displayed to a user when the user desires to create a table according to some implementations. The user interface 300 may be a graphic user interface (GUI) displayed to the user by a browser or other application running on the user device 104. The user interface 300 may include a request type area 302 that enables a user to select a type of request for creating or modifying a database object. Typical request types may include table requests 304, column requests 306, or administrative requests 308. For example, table-related requests may include copy table 310, create table 312, deprecate table 314, or change retention of a table 316.

In addition, the user interface 300 may include a search area 318 that can be used to search for specific requests that have been made by a user. For example, the search area 318 enables a user to search for a request based on one or more fields that may include: the date of the request, as indicated at 320; the identity of the requester, as indicated at 322; the status of the request, as indicated at 324; the request type, as indicated at 326; the date on which the request was approved, as indicated at 328; the identity of the approver, as indicated at 330; or the object name, as indicated at 332. Furthermore, the user may elect to receive a detailed view of the request by selecting checkbox 334. When the user has entered information into one or more of the search fields, the user may click on a search button 336 to conduct the search.

In the illustrated example of FIG. 3, the user has elected to create a table which invokes the user interface create table component 202 and brings up a create table interface 340 in the user interface 300. The create table interface 340 displays a request ID 342 that will be associated with the request for creating the table. The create table interface 340 also includes a plurality of user-Tillable entry boxes, which may include a schema name 344, a logical database name 346, a table name 348, a columns description 350, an expected rows count 352, an average row size 354, a table load type 356, and a primary key column 358. For example, the schema name 344 establishes the owner of the table and the schema in which the table will be created. Additionally, the logical database name 346 identifies a logical database with which the schema name 344 is associated. For example, as mentioned previously, a user's schema may be stored in multiple databases, such as in backup databases or different databases. It is desirable for a database object created or modified in a schema in a particular database to also be created or modified in the other databases that contain the schema. Thus, the logical database may be presented to the user as a single database, but actually represents the multiple separate databases that each contain a version of the user's schema. Accordingly, by creating or modifying a database object in the named logical database 346, implementations herein automatically propagate the changes to each of the separate physical databases associated with the named logical database 346.

The table name 348 may be determined by the user, and the columns entry box 350 may receive a list of the columns that the user would like to have in the table being created, e.g., the column names. Additionally, if the user desires one or more columns to be secure, such as visible to only a certain class of user, or the like, the user may specify this in the columns entry box 350, or the create table interface 340 may provide a separate entry box (not shown in FIG. 3) for identifying these columns For instance, this option might be used where certain columns of the table contain sensitive information, personal information, and so forth.

In addition, in some implementations, the create table interface 340 may perform on-the-fly validation and change the create table interface 340 dynamically based on user inputs and choices to present additional entry boxes for the user to fill in. As mentioned above, the interface 300 may change dynamically based on selections or entries made by the user, display error messages, request additional information, or the like, with the configuration illustrated in FIG. 3 being merely representative of one possible configuration. For example, if the user is specifying a column partition, an additional entry box may be provided to enable entry of the column partition information. Further, if the user enters information that does not pass real time validation, the user may be informed of this and prompted to enter different information or offered guidance. Consequently, in some implementations, the entries to the create table interface 340 may be provided to the input validation module 136 of the UI module 102 in real time to perform the checking and validation of the user inputs.

The expected rows count 352 and the average row size 354 enable the determination of an appropriate table space in which to place the table being created. The table load type 356 may include a drop-down menu that specifies a load type, such as "insert" or "merge." Finally, the primary key column 358 identifies on which column(s) of the table a primary key will be built. Furthermore, in some implementations, alternative or additional information might be collected by the create table interface 340, such as creation of a secondary index, specification of a partition range, identifying marketplaces in a partitioning scheme, specification of a tablespace, and so forth, with the foregoing being non-limiting examples of information that may be collected from the user for creating a table.

Figure 4:
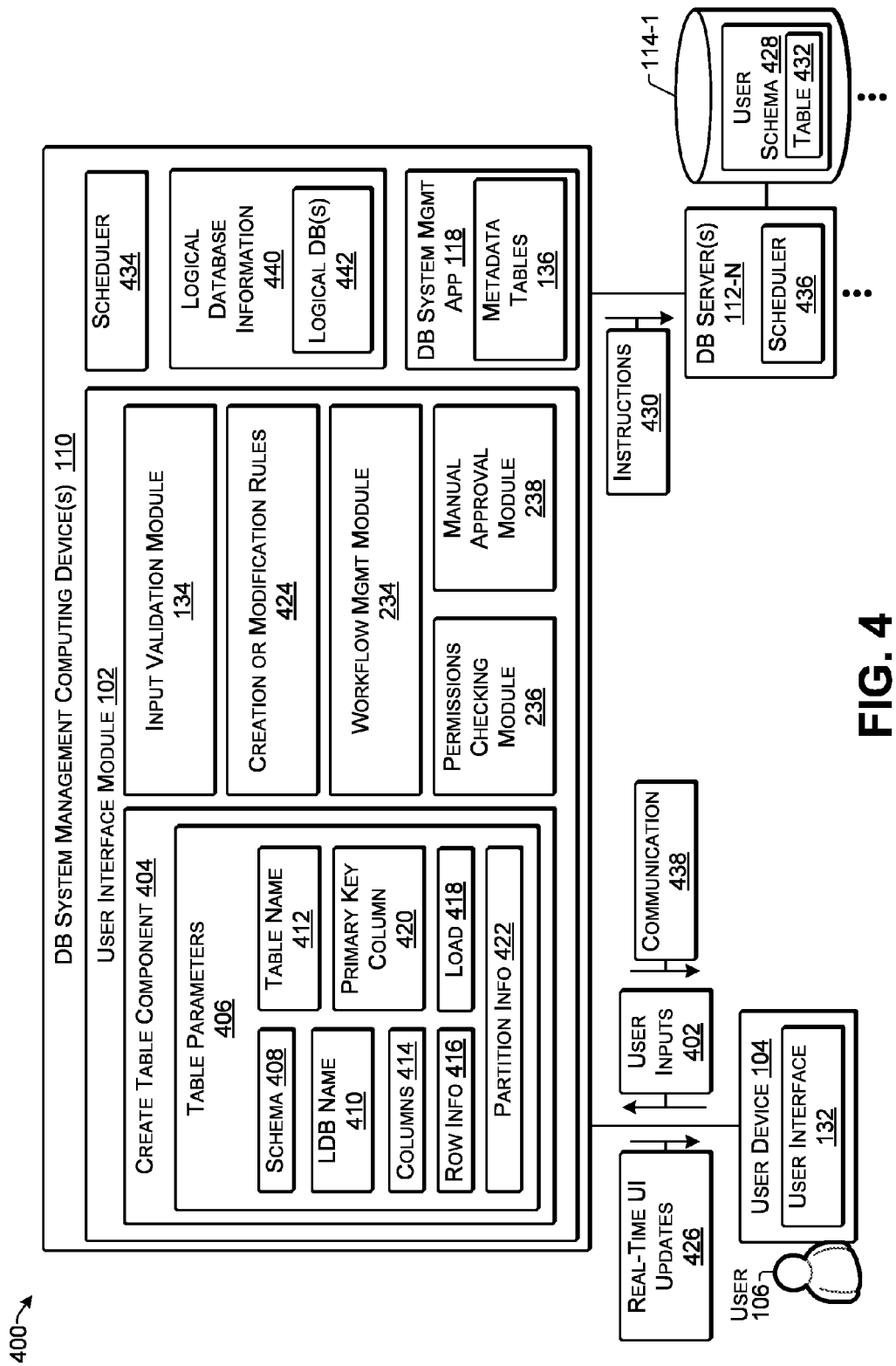
FIG. 4 illustrates an example framework for creating a database object according to some implementations.

FIG. 4 illustrates an example framework for creating or modifying a database object according to some implementations. Furthermore, while this example is described in the context of creating a table, those of skill in the art will appreciate that this example demonstrates techniques that can be applied to the other tasks or operations described herein for creating and/or modifying other types of database objects. Thus, implementations herein are not limited to the specific examples provided.

In the example of FIG. 4, suppose that the user 106 is filling in the entry boxes 344-358 in the create table interface 340, as discussed above with respect to FIG. 3. The user inputs 402 may be provided to the UI module 102 in real time and, in response, the UI module 102 begins execution of an instance of a create table component 404. For example, the user 106 may select the create table link 312 in the user interface 300. The create table component 404 receives table parameters 406 from the user inputs 402 as part of a table creation request. Some non-limiting examples of the table parameters 406 may include the schema name 408, logical database name 410, table name 412, columns information 414, row information 416, load type information 418, primary key column 420, and partition information 422.

The workflow management module 234 may invoke the input validation module 136 to perform real-time validation of the user inputs 402 made by the user 106. For example, the validation module 136 verifies and validates the table parameters 406 using a set of creation or modification rules 424 and/or the metadata tables 138 to dynamically evaluate the user inputs. For example, the input validation module 136 may apply the creation or modification rules 422 when checking the user inputs 402 as the user inputs 402 are entered into the user interface 132 to ensure that all required information is entered; to ensure that the entered information conforms to database rules for creation of the object; to ensure that the entered information does not conflict with other entered information; to ensure that the databases being targeted for the creation or modification are available, and so forth. For example, with respect to creation of a table, the input validation module 136 may check the definition of the table, check the size of the table, determine suitability of a partition for the table, availability of targeted databases, and so forth. The creation or modification rules 422 may also be applied to the metadata tables 138 to automatically crosscheck the validity of the user inputs. For example, if the user specifies a partition column, and partition keys are specified, the table creation rules 422 may apply the metadata tables 138 to verify that the keys match the partition columns, and so forth. Thus, the creation or modification rules 422 may be applied to check for consistency and completeness of the user inputs 402 to perform an automated validation of the table creation request prior to its submission. Further, as mentioned above, in some implementations, as the user is entering information into the user interface 132, the user interface 132 may provide real-time user interface updates 426, which may, for example, present additional entry blocks to request additional information, depending on the inputs selected by the user during submission of the user inputs 402. Thus, implementations herein can automatically verify the user inputs 402 for construction of the table creation request before the user is permitted to submit the completed table creation request.

In some implementations, the workflow management module 234 may invoke the permissions checking module 236 as the user 106 submits the user inputs 402, while in other implementations, the permissions checking module 236 is not invoked until the user has finished entering the user inputs 402. The permissions checking module 236 may check one or more user permissions or authorizations to ensure that the user 106 who is requesting creation of the table has permission or authorization to request creation of a table in a user schema 428 corresponding to the schema name 408. For example, the permissions checking module 236 may check a login ID, biometric information, or other identifier of the user against a list of users authorized to create or modify a database object in a particular named schema 408, logical database 410, or the like. In some instances, if the user does not have permission to create or modify the database object, a message to that effect may be displayed to the user 106 in the user interface 132 in real time as the user submits the user inputs 402.

Furthermore, in some implementations, the workflow management module 234 may invoke the manual approval module 238. For example, the manual approval module 238 may be invoked after the user has completed entering the user inputs 402 for submitting a table creation request. The manual approval module 238 may forward the table creation request to seek authorization of the table creation request from a primary owner of the schema. For example, in some implementations, the manual approval module 238 may forward the table creation request to a person who is a manager of a group, e.g., a lightweight directory access protocol (LDAP) group, or the like, that has primary (or in some cases secondary) responsibility for the user schema 428 that is the target of the table creation request. Thus, the manual approval module 238 may obtain manual approval of the table creation request. In some implementations, the approval request from the manual approval module 238 may be provided in the form of an electronic communication that includes a link. The link may provide a user interface, similar to the table creation interface 340 described above, that includes an "approve" button and a "decline" button, selectable by the person performing the manual approval.

Following the user input validation, the checking of user permissions, and/or the manual approval of the table creation request, the workflow management module 234 may generate instructions 430 to be delivered to one or more database servers 112 corresponding to one or more databases 114. For example, the instructions 430 may include the table parameters 406 received as the user inputs 402, and may also include an instruction to perform the request of the user, which in this example is the creation of a table 432. In some examples, the instructions 430 may be a single line of code that includes the table parameters 406.

Following generation of the instructions 430 to create the table 432, the workflow management module 234 may provide the instructions 430 to a scheduler 434. The scheduler 434 communicates with schedulers 436 on each of the database servers 112 to schedule the creation of the table 432 in the user schema 428 on each of the databases 114 that maintains a copy of the user schema 428. For example, in some implementations, the scheduler 434 may arrange to have the table created during non-peak hours, or the like. Additionally, in some implementations, a plurality of creation or modification tasks may be prioritized by the scheduler 434 according to one or more predetermined priority values for various tasks, LDAP groups, and so forth.

Based on the scheduling, the instructions 430 to create the table are provided to each database server 112-1, . . . , 112-N that includes the designated user schema 428 in its respective database 114-1, . . . , 114-N. Each such server 112 receives the instructions 430, and the DBMA 116 on the server 112 may perform additional validation and create the table 432 in the user schema 428, as discussed additionally below with respect to FIG. 5. During each of the steps described above, including the validation, the permission checking, the manual approval, the scheduling of the database object creation or modification, and the processing by the individual database servers 112, the user may be provided with real-time updates 426 to the user interface 132 showing the progress of the database object creation or modification. Additionally, following the successful creation of the table 432 in the databases 114, a communication 438 may be delivered to the user 106, such as through the user interface 132, through an email, text messaging, or other communication mechanism, to notify the user 106 that the table 432 was successfully created in one or more of the databases 114. Alternatively, if an error occurs during the creation of the table, the user permissions do not permit creation of the table, or the schema owner or group manger denies authorization to create the table, the communication 438 may provide an "error" or "declined" message, respectively. Upon receiving an error or declined message, the user 106 may follow up with the database administrator and/or the schema owner/group manager to determine a resolution.

The information regarding which databases 114 are to be modified may be obtained from the logical database information 440. For example, the logical database information 440 may include a representation of a logical database 442 of the user's schema 428 distributed on the multiple databases 114-1, . . . , 114-N. In some implementations, the logical databases 442 for a plurality of user schemas maintained in the databases 114 may be determined in advance, and provided for access by a plurality of users 106 that have schemas in the databases 114. Accordingly, through the user interface 132, the particular user 106 is able to interact with the corresponding logical database 442 of that particular user 106, such as for creating or modifying schema objects in the user schema 428 as if there were only a single database. By using the logical database information 440 to correlate the logical database 442 of the user 106 with the plurality of physical databases 114, the instructions 430 to modify the user schema 428 may be automatically scheduled through the scheduler 434 to be applied across the multiple physical databases 114, as identified from the logical database information 440. Accordingly, it is not necessary for the user to login to each physical database 114 in order to create or modify a schema object in the user schema 428 in each physical database 114. Instead, the user can utilize the user interface 132 to automatically create or modify a schema object across a plurality of databases 114 that include the user schema 428. Thus, implementations herein enable a business user of a database to create or modify multiple schema objects in multiple databases using standardized inputs without preexisting knowledge of database language syntax and without the assistance of a database administrator.

Figure 5:
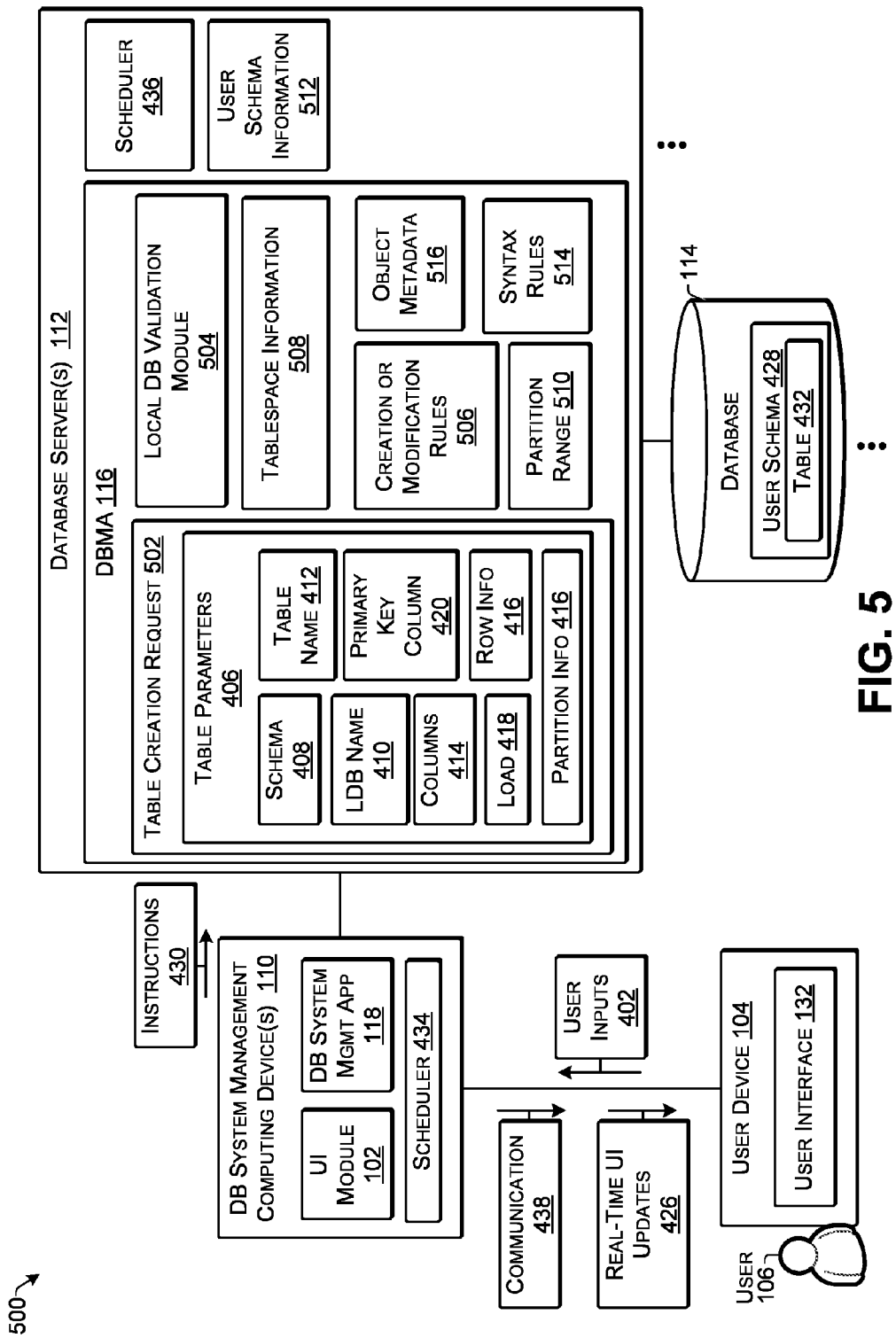
FIG. 5 illustrates an example framework for creating a database object on each database according to some implementations.

FIG. 5 illustrates an example framework 500 for creating or modifying a database object on each individual database 114 according to some implementations. Furthermore, while this example is described in the context of creating a table, those of skill in the art will appreciate that this example demonstrates techniques that can be applied to the other tasks or operations described herein for other types of creating and/or modifying database objects. Thus, implementations herein are not limited to the specific examples provided.

In the illustrated example of FIG. 5, the database management application (DBMA) 116 on the server 112 receives the instructions 430 from the scheduler 434 on the DBSM computing device 110. For example, the instructions 430 may include a table creation request 502 that includes the table parameters 406 provided by the user inputs 402. In some implementations, the DBMA 116 may include a local database validation module 504 that validates the table creation request 502 using creation or modification rules 506. For example, the creation or modification rules 506 may include rules that apply to the particular database 114 associated with the particular server 112. For example, as mentioned above, a plurality of databases 114-1, . . . , 114-N may be used, and each may differ from the others in type of database, configuration, intended purpose, and so forth. Consequently, the parameters for creating or modifying the database object may be validated based on the particular type and configuration of each particular database 114 that receives the instructions 430. In this example, the local database validation module 504 may apply the creation or modification rules 506 to the table parameters 406, in light of local database information such as tablespace information 508 for the particular database 114, a table partition range 510, and user schema information 512. If the table creation request 502 does not pass the validation by the local database validation module 504, the local database validation module 504 may return an error message to the UI module 102, which in turn may provide the error message to the user 106 in one of the communication 438 and/or the real time UI update 426.

On the other hand, if the table creation request 502 does pass the validation by the local database validation module 504, the DBMA 116 may proceed to create the table 432 in response to the table creation request 502. In some implementations, the DBMA 116 may generate DDL instructions that are then executed for creating the table 432 according to the table parameters 406. For instance, if the user 106 does not specify a partition range, the DBMA 116 may determine a partition range 510. The DBMA 116 may also examine tablespace information 508 to identify available tablespace for creating the table 432. The DBMA 116 may apply syntax rules 514 to the table parameters 406 along with other relevant information, such as the tablespace information 508 and partition range 510 to generate the DDL instructions for the table 432, and then apply the DDL instructions to create the table 432 in the user schema 428 in the associated database 114. For example, the syntax rules 514 may specify syntax in DDL or other suitable database language syntax. Further, the DBMA 116 may generate object metadata 516 for the table 432 to be used in the management of the table 432. Additionally, the foregoing is just one example of a technique for creating a database object in a database. Numerous other possible techniques will be apparent to those of skill in the art in light of the disclosure herein. Further, while the foregoing example describes the creation of a table in a database, it will be apparent to those of skill in the art that the techniques described above may be applied for other types of creation or modification of database objects according to any of the other interface components described above.

Figure 6:
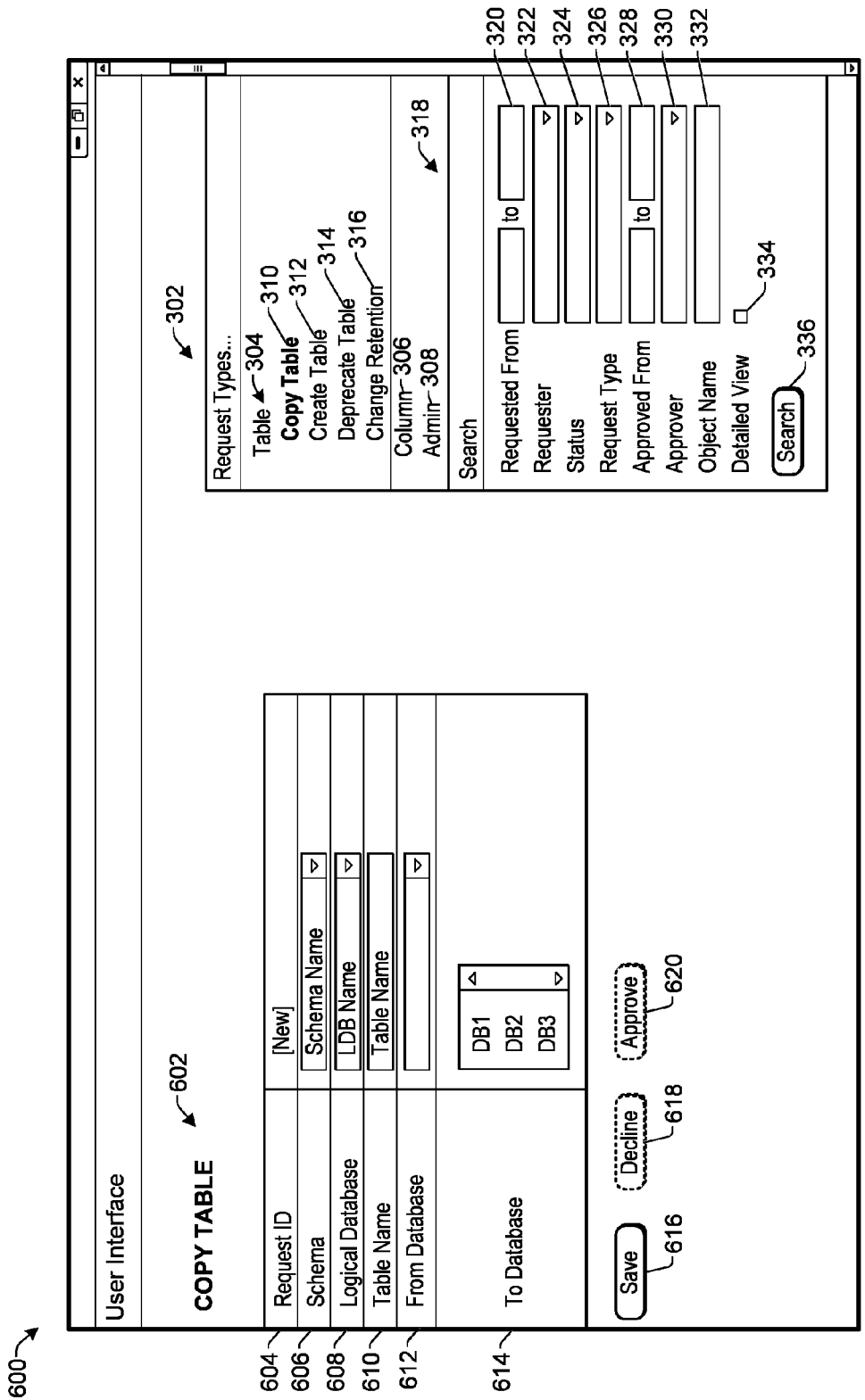
FIG. 6 illustrates an example user interface for copying a database object according to some implementations.

FIG. 6 illustrates an example of a user interface 600 that may be displayed to a user when the user desires to copy a table either within a database or from one database to another database. In this example, the user has selected the copy table request 310 under the request types 302, and is presented with the copy table interface 602. The copy table interface 602 includes a request ID 604, which may be automatically generated, a schema name 606, a logical database name 608, a table name 610, an identification of the database 612 from which the table is to be copied; and an identification of the database 614 to which the table is to be copied. When the user has filled in the requested information in the copy table interface 602, the user may click on a save button 616 to have the request sent to the UI module 102. Similar to the task described above with respect to FIG. 4, the UI module 102 may execute a copy table component and receive the parameters input by the user into the copy table interface 602. The workflow management module 234 may invoke the input validation module 136 to determine validation in real time of the user inputs, invoke the permissions module 236, invoke the manual approval module 238, and so forth. Additionally, in some implementations, one or more of validation, permission checking, or manual approval may be skipped, or not carried out during the creation or modification of a database object.

Furthermore, the interface 602 in this example also shows a decline button 618 and an approved button 620 that may be used by the schema owner or group manager to decline or approve the copy table request. Thus, the buttons 618, 620 may not be available for selection by the user 106, but are selectable by authorized personnel. For example, as discussed above, the completed copy table request may be sent to the schema owner or group manager for obtaining manual approval. Accordingly, the schema owner may use the same web-based interface 602 for an approval interface when determining whether to approve or decline the copy table request.

The other schema object creation or modification functions described above with respect to FIG. 2 for components 202-232 may be carried out in a similar manner to the techniques described above with respect to FIGS. 3-6. Accordingly, a detailed explanation of each function of each component 202-232 is not described herein as the foregoing sets forth sufficient detail for one of skill in the art to understand the operations involved.

Figure 7:
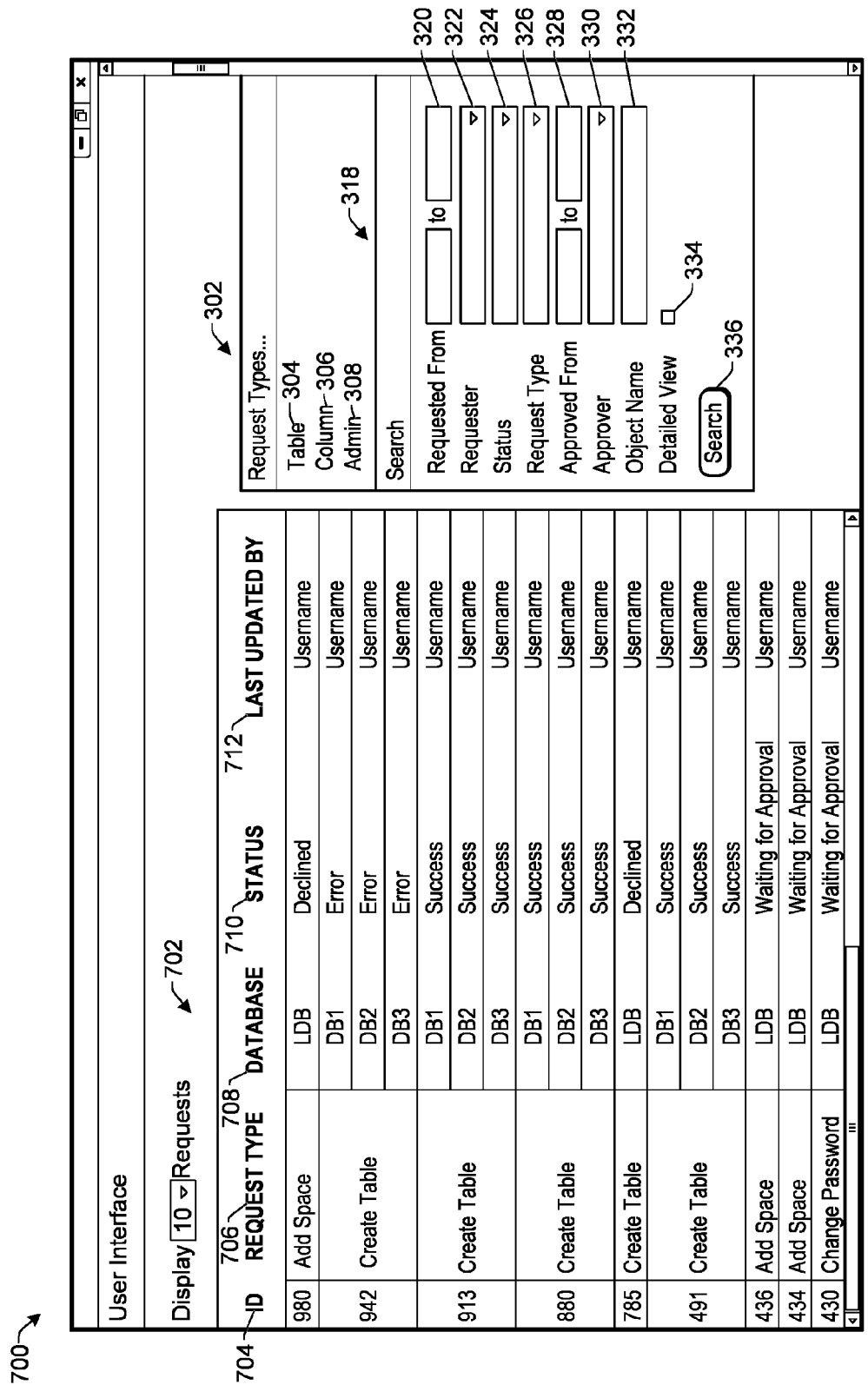
FIG. 7 illustrates an example user interface for viewing a summary of user-initiated database modification requests according to some implementations.

FIG. 7 illustrates an example of a user interface 700 that may be displayed to a user following execution of a search for recent requests submitted by the user using the search interface 318. Accordingly, the user may obtain a summary 702 of recent requests that includes a request ID 704, a request type 706, a database 708 to which the request was applied, a status 710 of each request, and a name 712 of the person who last updated the request. Furthermore, other types of information may also be displayed in the summary 702 such as an approver of the request, a date the quest was submitted, an object name, the date on which the request was approved, and so forth.

Figure 8:
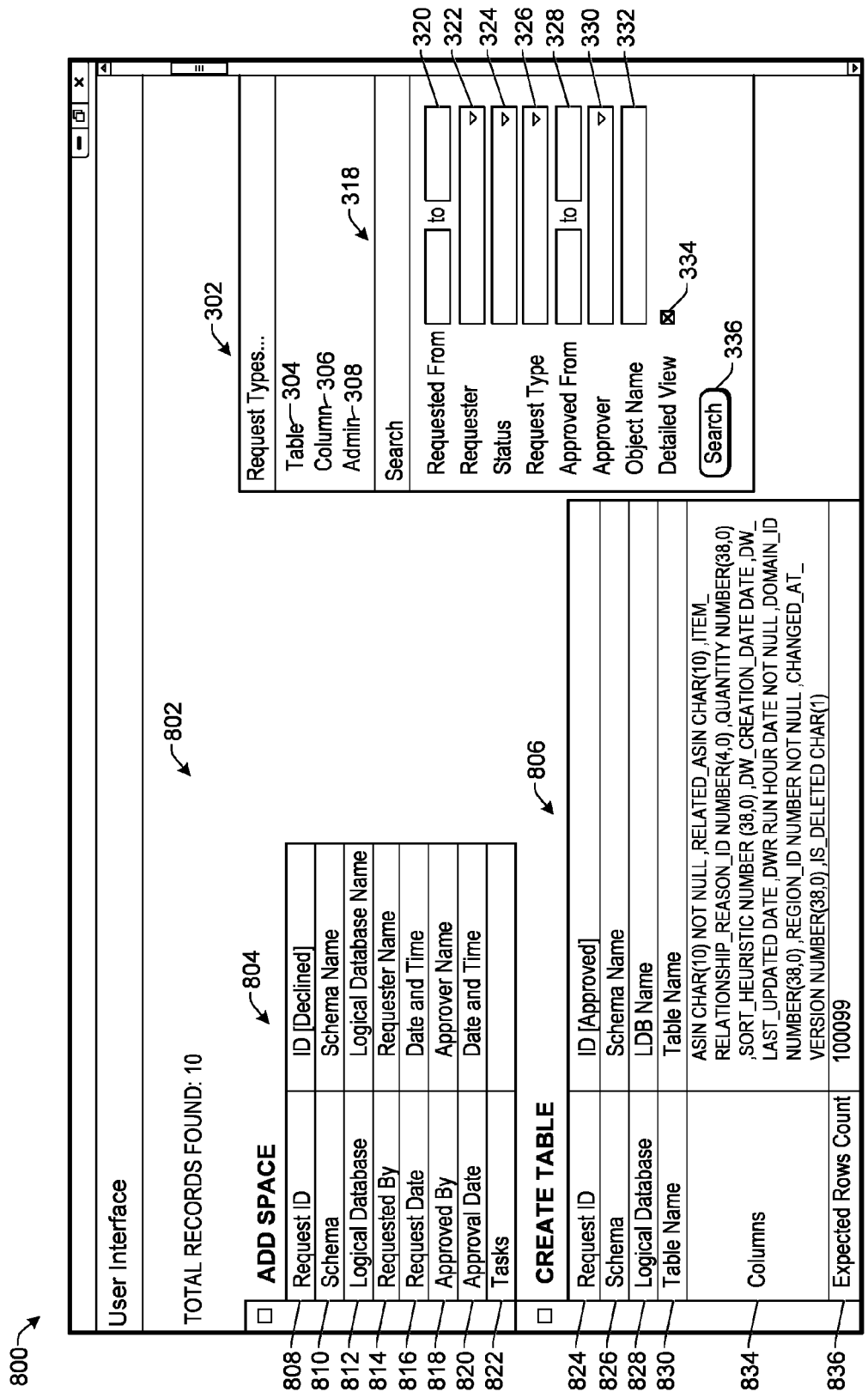
FIG. 8 illustrates an example user interface for viewing details of user-initiated database modification requests according to some implementations.

FIG. 8 illustrates an example user interface 800 that displays a detailed view 802 to the user upon selection of the detailed view check box 334, such as from the summary view 702 described above. In this example, the detailed view 802 includes details of an add space request 804 and a create table request 806, showing specific details of the information entered by the requester for each request. For example, the detailed information for the add space request 804 includes the request ID 808, the schema name 810, the logical database name 812, the requester name 814, the date and time of the quest 816, the approver name 818, the date and time of approval 820, and any associated tasks 822. Similarly, the detailed information for the create table request 806 includes the request ID 824, the schema name 826, the logical database name 828, the table name 830, the columns information 834, and the expected rows count 836, with the remaining information for this create table request 806 being visible upon scrolling further down the page. Furthermore, while several example user interfaces have been illustrated herein for discussion purposes, numerous other interface configurations may be used and thus implementations herein are not limited to any particular configuration or arrangement of the user interfaces.

Example Processes

Figure 9:
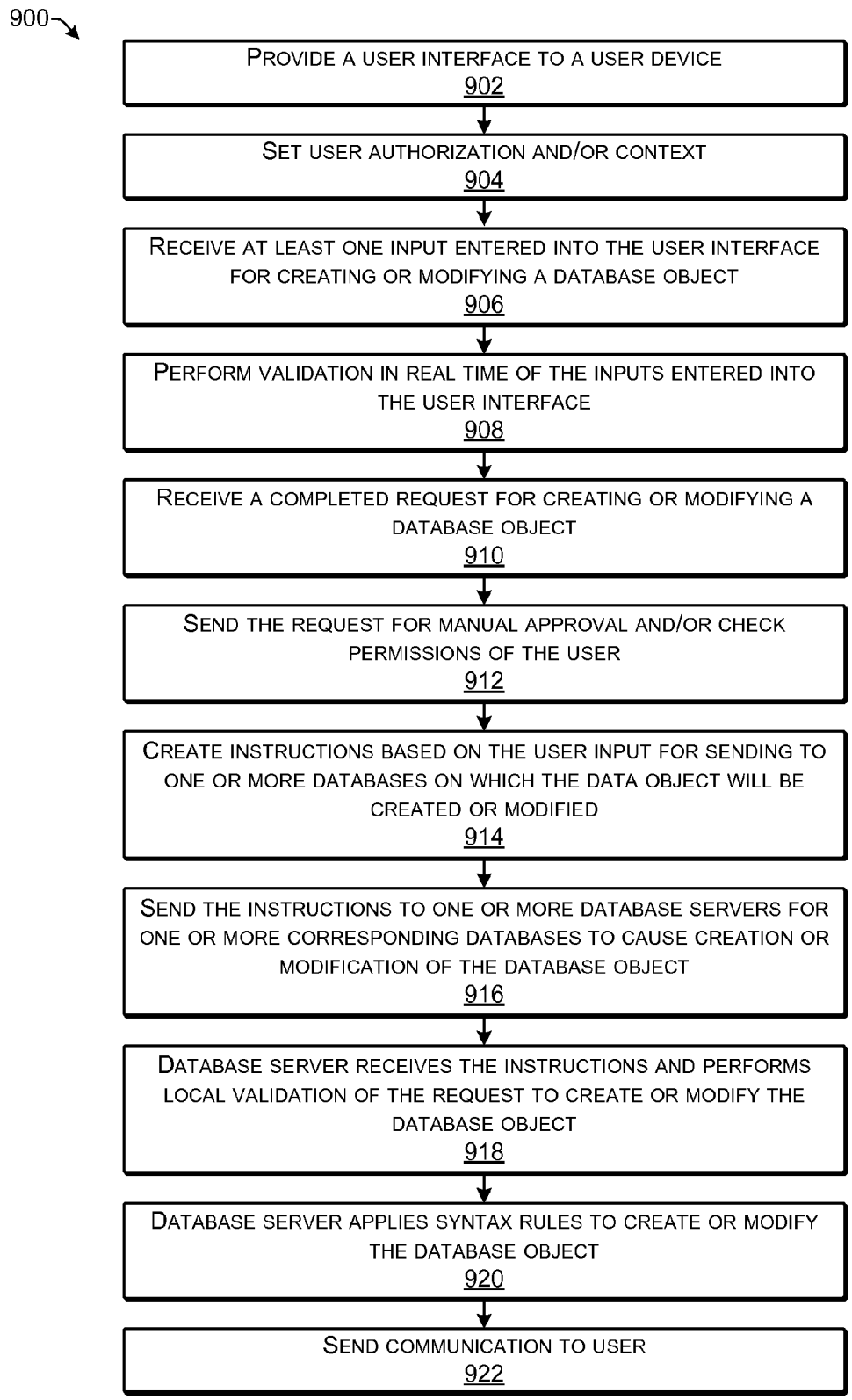
FIG. 9 is a flow diagram illustrating an example process for creating or modifying database objects according to some implementations.

FIG. 9 illustrates an example process for implementing the techniques described above. The process is illustrated as a collection of operations in a logical flow graph, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the process is described with reference to the architectures, frameworks and environments described in the examples herein, although the process may be implemented in a wide variety of other architectures, frameworks or environments.

FIG. 9 is a flow diagram illustrating an example process 900 for creating or modifying a database object according to some implementations.

At block 902, a user interface is provided to a user device to enable the user to create or modify a database object. For example, in some implementations, the UI module 102 may provide a web-based user interface 132 to a user device 104 for display on the user device 104. In some implementations, the user interface 132 may be displayed in a browser window, and may enable the user to enter one or more inputs for creating or modifying a database object in one or more databases. For example, the UI module may receive selection of a particular creation or modification task, and the UI module may invoke the corresponding interface component to display an instance of the user interface to the user configured for performing the selected database object creation or modification task.

At block 904, the UI module may determine an authorization and/or a context for the user. For example, the UI module 102 may determine an authorization of the user 106 based on a login of the user 106 to the user device 104. Alternatively, the UI module 102 may present a login interface to the user 106 in the user interface 132 to obtain a user login ID and/or password or other authentication information of the user 106. Additionally, the UI module may determine a context of the user 106 as being associated with a particular workgroup, database schema, LDAP group, or the like. For example, the UI module may associate a user ID of the user 106 with a particular group, organization or set of clients based on lists of user ID associations accessible to the UI module 102.

At block 906, the UI module receives at least one input entered into the user interface for creating or modifying a database object. For example, the user interface may transmit the user inputs in real time to the UI module.

At block 908, the input validation module performs validation in real time of the user inputs entered into the user interface. For example, the input validation module may check the user inputs against a set of rules that are applied for creating or modifying a database object in reference to one or more metadata tables that correspond to the displayed user interface. The input validation module may provide feedback in real time, such as by updating the user interface to provide assistance or to obtain additional information from the user.

At block 910, the UI module receives a completed request for creating or modifying a database object. For example, when the user has completed all the information requested by the user interface, the user may submit the completed request to the UI module.

At block 912, the UI module may send a completed request for manual approval and/or check permissions of the user with respect to the request. For example, the UI module may employ a manual authorization module to send the request to a primary owner of a schema that is a target of the request to obtain manual approval of the request. Additionally or alternatively, a check permissions module may check the permissions of the user that submitted the request to determine whether the user is authorized to make the request. Further, in some implementations, the permissions of the user may be checked as the user is entering the inputs into the user interface.

At block 914, the workflow management module creates instructions based on the user inputs for sending to one or more databases on which the database object will be created or modified. For example, the instructions may include parameters entered by the user and validated by the input validation module At block 916, the workflow management module sends the instructions to one or more database servers for one or more corresponding databases to cause creation or modification of the database object on the one or more databases. For example, the workflow management module may forward the instructions to a scheduler, which schedules the modification or creation of the database object with the servers for each separate database.

At block 918, the database server(s) receives the instructions and performs local validation of the request to create or modify the database object based on the input parameters and creation or modification rules of the database.

At block 920, when the instructions pass validation, the database server may apply syntax rules and other relevant information, such as tablespace information, partition range and user schema information to create or modify the database object, such as in the corresponding user schema. Upon successful creation or modification, the database server may send a communication to the UI module, informing the UI module that the database object has been created or modified.

At block 922, the UI module sends a communication to the user reporting the successful creation or modification of the database object. In some implementations, the communication may be displayed to the user in the user interface in real time. Alternatively, if the database object is not created or modified as requested, or if the request was not approved, the communication to the user may report that there was an error or that the request was declined, respectively.

The example process described herein is only an example of a process provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

Example Computing Devices

Figure 10:
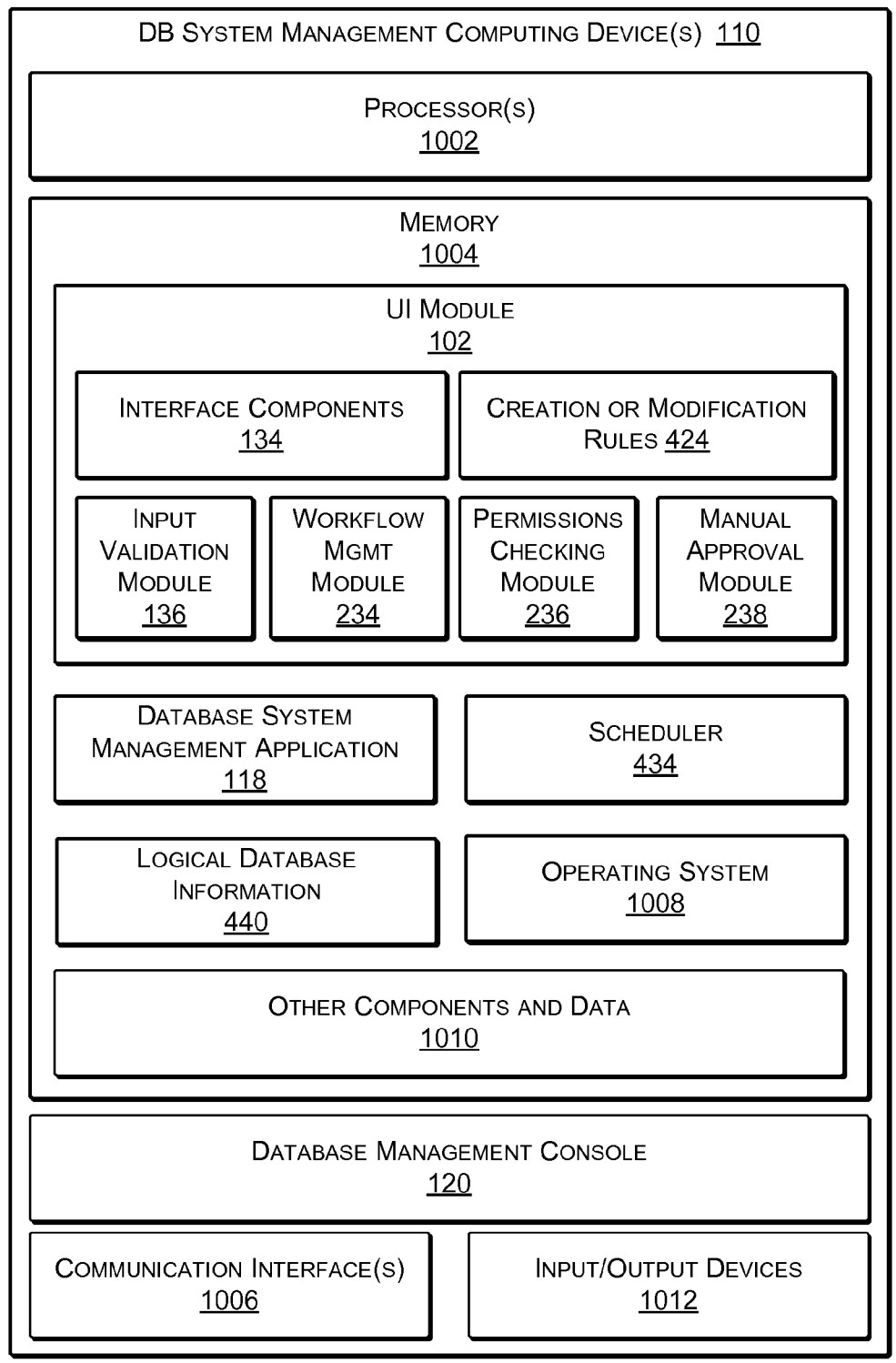
FIG. 10 illustrates select components of an example database system management computing device according to some implementations.

FIG. 10 illustrates select components of one or more database system management (DBSM) computing devices 110 that may be used to implement the functionality of the UI module 102 according to some implementations. For example, the UI module 102 may be hosted on one or more servers or other types of computing devices that may be embodied in any number of ways. For instance, in the case of a server, the UI module 102 may be implemented on a single server, a cluster of servers, a server farm or data center, a cloud hosted computing service, and so forth, although other computer architectures (e.g., a mainframe architecture) may also be used. Further, while the figures illustrate the components of the UI module 102 as being present in a single location, it is to be appreciated that these components may be distributed across different computing devices and locations in any manner. Generally, the UI module 102 may be implemented by one or more computing devices, with the various functionality described herein distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises. Further, the database servers 112 may have a similar hardware configuration as the DBSM computing device 110, with different functional components and data, such as those illustrated in the example of FIG. 5.

In the illustrated example, the DBSM computing device 110 includes one or more processors 1002, a memory 1004, and one or more communication interfaces 1006. The processor(s) 1002, as well as the other processors described herein, may be a single processing unit or a number of processing units, and may include single or multiple computing units or multiple cores. The processor(s) 1002 can be configured to fetch and execute computer-readable instructions stored in the memory 1004 or other computer-readable media.

The memory 1004, as well as the other memories described herein, may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium which can be used to store the desired information and which can be accessed by a computing device. Depending on the configuration of the DBSM computing device 110, the memory 1004 may be a type of computer readable storage media and may be a non-transitory storage media.

The memory 1004 may be used to store any number of functional components that are executable by the processors 1002. In many implementations, these functional components comprise instructions or programs that are executable by the processors 1002 and that, when executed, implement operational logic for performing the actions attributed above to the UI module 102. Functional components stored in the memory 1004 may include the UI module 102, the interface components 134, the input validation module 136, the workflow management module 234, the permissions checking module 236, and the manual approval module 238, as described above, which may be executed on the processors 1002 for implementing the various functions and features of the UI module 102 described herein. The functional components may also include the database system management application 118 and the scheduler 434. Additional functional components stored in the memory 1004 may include an operating system 1008 for controlling and managing various functions of the DBSM computing device(s) 110. The memory 1004 may also store the creation or modification rules 424, the logical database information 440, and other components and data 1010, which may include the metadata tables 138. The DBSM computing device(s) 110 may also include many other logical, programmatic and physical components, of which those described above are merely examples that are related to the discussion herein.

The communication interface(s) 1006 may include one or more interfaces and hardware components for enabling communication with various other devices, such as user devices 104 and servers 112 over the communication link 108. For example, communication interface(s) 1006 may facilitate communication through one or more of the Internet, cable networks, cellular networks, wireless networks (e.g., Wi-Fi, cellular) and wired networks. Various different approaches to implementations described herein can be implemented in various environments. For instance, the communication link 108 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

DBSM computing device(s) 110 may further be equipped with various input/output devices 1012. Such I/O devices 1012 may include a display, various user interface controls (e.g., buttons, joystick, keyboard, touch screen, etc.), audio speakers, connection ports and so forth. In some implementations, rather than having I/O devices 1012, the database management console 120 is directly connected to the DBSM computing device(s) 110.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

The invention claimed is:

1. One or more non-transitory computer-readable media maintaining instructions executable by a processor to perform operations comprising:
    accessing one or more first metadata tables associated with a first task, wherein the first task creates or modifies a first schema object in a schema of a user;
    generating a first user interface from information obtained from the one or more first metadata tables, wherein the first user interface includes first features associated with the first task;
    providing the first user interface to a user device associated with the user;
    receiving from the user device at least one input entered into the first user interface for creating or modifying a schema object in the schema of the user;
    performing a validation of the at least one user input received from the user device based, at least in part, on additional information included in the one or more first metadata tables;
    identifying a plurality of physical databases that maintain the schema of the user;
    sending instructions including the at least one input to one or more computing devices associated with individual ones of the plurality of physical databases, the instructions instructing the one or more computing devices to create or modify the first schema object in the schema of the user on the individual ones of the plurality of physical databases according to the first task, wherein creation or modification of the first schema object in the schema of the user is propagated across at least a subset of the plurality of physical databases that maintain the schema of the user in response to the at least one input;
    accessing one or more second metadata tables associated with a second task, wherein the second task creates or modifies a second schema object in the schema of the user;
    generating a second user interface from information obtained from the one or more second metadata tables, wherein the second user interface includes second features associated with the second task; and
    providing the second user interface to the user device.

2. The one or more non-transitory computer-readable media as recited in claim 1, the validation comprising applying one or more rules for the creation or the modification of the first schema object in real time in response to the at least one input to determine a validity of the at least one input with respect to creating or modifying the first schema object, wherein the one or more rules are based, at least in part, on the one or more first metadata tables.

3. The one or more non-transitory computer-readable media as recited in claim 1, the operations further comprising changing a parameter in at least one metadata table of the one or more first metadata tables to change a particular first feature of the first user interface for receiving the at least one input.

4. The one or more non-transitory computer-readable media as recited in claim 1, wherein the operation of identifying the plurality of physical databases that maintain the schema of the user further comprises, at least in part, referring to logical database information maintained for the schema of the user to identify the physical databases that maintain the schema of the user.

5. The one or more non-transitory computer-readable media as recited in claim 1, wherein the operation of receiving the at least one input entered into the first user interface further comprises receiving a plurality of inputs entered into the first user interface for creating a table as the first schema object in the schema of the user, the plurality of inputs including a name of the schema and column information for creating the table.

6. The one or more non-transitory computer-readable media as recited in claim 1, wherein the creation or modification of the first schema object in the schema of the user is propagated across at least a subset of the plurality of physical databases that maintain the schema without the user logging into each of the subset of the plurality of physical databases.

7. A method comprising:
    under control of one or more processors specifically configured with executable instructions,
    generating a user interface from information obtained from a metadata table associated with a task to create or modify a database object, the user interface including features associated with the task;
    receiving, from a user device associated with a user, at least one input entered into the user interface for creating or modifying the database object;
    determining, based at least in part on logical database information, a plurality of separate databases that maintain information of the user; and
    sending instructions including the at least one input entered into the user interface to one or more computing devices associated with individual ones of the plurality of separate databases, to create or modify the database object in the plurality of separate databases that maintain the information of the user, wherein creation or modification of the database object based on the input from the user is automatically propagated across at least a subset of the physical databases that maintain information of the user without the user logging into each physical database to which the creation or modification of the database object is propagated.

8. The method as recited in claim 7, wherein:
the information of the user maintained in the plurality of separate databases is a schema of the user; and
the instructions for creating or modifying the database object comprise instructions for creating or modifying a schema object in the schema of the user in the plurality of separate databases.

9. The method as recited in claim 8, wherein the instructions for creating or modifying the database object comprise instructions for creating a table in the schema of the user.

10. The method as recited in claim 8, wherein the instructions for creating or modifying the database object comprise instructions for at least one of:
adding a column to a table;
altering a column to null;
modifying precision of a column
granting privileges on a table;
revoking privileges on a table;
creating a new entity partition;
copying data from a remote table;
cloning a remote table;
cloning a local table;
creating an index;
synchronizing indexes;
exchanging table partitions;
deprecating a table;
flipping a table to production; or
renaming a table.

11. The method as recited in claim 7, further comprising, in response to receiving the at least one input entered into the user interface for creating or modifying the database object, checking a validity of the at least one input against a set of creation or modification rules in real time.

12. The method as recited in claim 7, further comprising including in the user interface provided to the user device a view that provides a summary of requests submitted for creating or modifying database objects, the summary providing a status of the requests.

13. The method as recited in claim 12, further comprising including in the user interface provided to the user device a view that provides a detailed view of the requests submitted for creating or modifying database objects, the detailed view showing a plurality of inputs associated with each request submitted for creating or modifying database objects.

14. The method as recited in claim 7, prior to sending the instructions for creating or modifying the database object to the one or more computing devices, checking permissions of the user to request creation or modification of the database object.

15. The method as recited in claim 7, prior to sending the instructions for creating or modifying the database object to the one or more computing devices, submitting a request from the user for creating or modifying the database object for manual approval by providing a web-based approval interface.

16. The method as recited in claim 7, wherein the one or more computing devices associated with each database of the plurality of separate databases performs a respective validation of the at least one input prior to creating or modifying the database object.

17. A system, comprising:
at least one computing device configured to implement one or more services, wherein the one or more services are configured to:
in response to receiving one or more inputs for creating or modifying a schema object of a user from a user interface provided to a user device of the user, checking a validity of the one or more user inputs against creation or modification rules to determine in real time whether the one or more inputs conform to creation or modification rules for creating or modifying the schema object, the creation or modification rules for creating or modifying the schema object being based, at least in part, on a metadata table that includes information to generate the user interface;
determine, from logical database information, a plurality of separate databases on which a schema of the user is maintained;
send the one or more user inputs to respective computing devices associated with each database of the plurality of separate databases to cause creation or modification of the schema object on individual ones of the plurality of separate databases, wherein creation or modification to the schema object is propagated across at least a subset of the separate databases that maintain the schema of the user in response to the one or more inputs; and
change a parameter of the metadata table to change a feature of the user interface, wherein the feature is configured to receive user input to change or modify the schema object.

18. The system as recited in claim 17, the operations further comprising sending an update to the user interface based on at least one user input received for creating or modifying the schema object.

19. The system as recited in claim 18, wherein the metadata table is one of a plurality of metadata tables stored by the computer-readable media, the plurality of metadata tables including one or more first metadata tables including first information to generate a first user interface that includes first features associated with a first task to create or modify the schema object, and the plurality of metadata tables including one or more second metadata tables including second information to generate a second user interface that includes second features associated with a second task to modify the schema object.

20. The system as recited in claim 17, the operations further comprising, applying one or more syntax rules to create or modify the schema object at least partly in response to determining that the one or more inputs conform to the creation or modification rules for creating or modifying the schema object.

21. The system as recited in claim 17, wherein the one or more user inputs are related to creating a table as the schema object in the schema of the user, and the operations further comprising:
creating new partitions in the plurality of physical databases maintaining the schema of the user based, at least in part, on the one or more user inputs.

22. The system as recited in claim 17, wherein the one or more user inputs are for creating a table as the schema object, the one or more user inputs comprising a name of the schema of the user and column information for creating the table, and the system further comprising a scheduler to communicate with a plurality of database servers to schedule the creation of the table in the schema of the user, wherein each database server of the plurality of database servers is in communication with a respective database of the plurality of databases and each respective database maintains the schema of the user.

23. The system as recited in claim 17, the operations further comprising checking permissions of the user to request the creating or modifying of the schema object.

24. The system as recited in claim 17, the operations further comprising sending an electronic communication for manual approval to create or modify the schema object corresponding to the one or more user inputs, the electronic communication including a link to provide a user interface including one or more buttons selectable to perform the manual approval.

\* \* \* \* \*